United States Patent [19]
Eglit

[11] Patent Number: 5,703,618
[45] Date of Patent: Dec. 30, 1997

[54] METHOD AND APPARATUS FOR UPSCALING VIDEO IMAGES WHEN PIXEL DATA USED FOR UPSCALING A SOURCE VIDEO IMAGE ARE UNAVAILABLE

[75] Inventor: Alexander Julian Eglit, Half Moon Bay, Calif.

[73] Assignee: Cirrus Logic, Inc., Fremont, Calif.

[21] Appl. No.: 561,907

[22] Filed: Nov. 22, 1995

[51] Int. Cl.$^6$ .................... G06K 9/36; G09G 5/00
[52] U.S. Cl. .................... 345/112; 345/130; 345/132; 345/115; 395/139; 395/520; 382/300; 358/451
[58] Field of Search .................... 345/112, 130, 345/131, 132, 154, 115, 127; 395/139, 520; 382/300; 358/451; 348/552, 581, 561

[56] References Cited

U.S. PATENT DOCUMENTS

| | | | |
|---|---|---|---|
| 4,771,275 | 9/1988 | Sanders | 345/186 |
| 4,819,185 | 4/1989 | Corona et al. | 395/143 |
| 4,885,786 | 12/1989 | Anderson et al. | 382/235 |
| 4,988,984 | 1/1991 | Gonzalez-Lopez | 345/132 |
| 5,008,752 | 4/1991 | Van Nostrand | 348/581 |
| 5,257,326 | 10/1993 | Ozawa et al. | 382/300 |
| 5,406,306 | 4/1995 | Siann et al. | 345/115 |
| 5,469,223 | 11/1995 | Kimura | 348/581 |
| 5,475,437 | 12/1995 | Song | 345/130 X |
| 5,481,275 | 1/1996 | Mical et al. | 345/132 |
| 5,511,137 | 4/1996 | Okada | 345/130 X |
| 5,513,281 | 4/1996 | Yamashita et al. | 382/300 X |
| 5,517,612 | 5/1996 | Dwin et al. | 395/139 X |
| 5,570,436 | 10/1996 | Fukushima et al. | 382/300 |
| 5,574,572 | 11/1996 | Malinowski et al. | 358/451 |
| 5,579,418 | 11/1996 | Williams et al. | 382/300 |
| 5,598,525 | 1/1997 | Nally et al. | 395/520 |
| 5,600,347 | 2/1997 | Thompson et al. | 345/132 X |

*Primary Examiner*—Raymond J. Bayerl
*Assistant Examiner*—Seth D. Vail
*Attorney, Agent, or Firm*—Robert Platt Bell & Associates, P.C.

[57] ABSTRACT

A graphics controller circuit for upscaling source video image to generate an upscaled video image. The graphics controller circuit generates additional pixel data for the upscaled video image by interpolating source video pixel data of a one scan line and an another scan line. However, when source video pixel data of the another scan line may not be available for interpolation, the graphics controller circuit generates additional pixel data from source video pixel data of only the one scan line. Source video pixel data of the another scan line may not be available, for example, as a bus that transfers the pixel data may not have sufficient amount of bandwidth.

18 Claims, 5 Drawing Sheets

Figure 1

METHOD AND APPARATUS FOR UPSCALING VIDEO IMAGES WHEN PIXEL DATA USED FOR UPSCALING A SOURCE VIDEO IMAGE ARE UNAVAILABLE

FIELD OF THE INVENTION

The present invention relates generally to computer graphics systems and more specifically to a method and apparatus for upscaling video images in a graphics controller circuit.

BACKGROUND OF THE INVENTION

A graphics controller circuit may display a source video image of a given size on a display area of a larger size. The graphics controller circuit may upscale the source video image for such display on the larger display area. For example, a CD-ROM decoder in a computer system may generate a source video image of size 160×120 pixels with each pixel being represented by a pixel data (for example, in RGB 888 format). A graphics controller circuit may generate additional pixel data to upscale the source video image, and generate display signals from the additional pixel data to display the upscaled video image on a display area of size 640×480 pixels on a display screen of a computer system.

Interpolation is a well-known prior art technique used for generating additional pixel data to upscale video images. In an interpolation scheme, a graphics controller circuit may use several adjacent pixel data of a source video image to generate additional pixels. FIG. 1 shows pixels (A–I) of a source video image and pixels (Rxx) that are additionally generated by interpolation. Pixel R12 may be generated, for example, by interpolating pixel data A and B using the formula ($\frac{4}{5}$ A+$\frac{1}{5}$ B) .

If each pixel is represented in RGB format, RGB components of pixel R12 may be generated by using corresponding components of pixels A, B. Pixel 51 may similarly be generated using the formula ($\frac{1}{5}$ A+$\frac{4}{5}$ C). Generation of pixels such as R12–R15 may be termed horizontal interpolation as pixels R12–R15 are generated using pixels A, B located horizontally. Generation of pixels such as R21–R51 may be termed vertical interpolation.

Graphics controller circuits in prior art computer systems may receive source image pixel data from a display memory over a bus, and interpolate the received pixel data to generate pixel data for additional pixels. Such a graphics controller circuit may then generate display signals from additional pixel data to a display unit to display an upscaled video image.

One problem with interpolation scheme of above is that a pixel datum may not be available to a graphics controller circuit when the graphics controller circuit requires the pixel datum for interpolation. Such a pixel datum may not be available as source Video pixel data may be provided at a rate lesser than a rate at which the graphics controller circuit may require the source video pixel data for interpolation.

The rate at which such source video pixel data is provided to a graphics controller circuit may be less due to throughput performance constraints within a computer system or outside of the computer system. For example, in a computer system, a memory may store source video pixel data and provide the pixel data to a graphics controller circuit over a bus for interpolation. Throughput performance limitations on the memory or transfer rate limitations on the bus may limit the rate at which the source video pixel data are provided to the graphics controller chip.

Similarly, performance constraints outside of a computer system may also limit the rate at which source video pixel data is provided to a graphics controller circuit. Such source video pixel data may be provided to the computer system over a slow speed transmission path, and as a result, the source video pixel data may not be available to a graphics controller circuit in the computer system at a rate required for interpolation.

A graphics controller circuit may wait until source video pixel datum required for interpolation is available. However, with such a wait for source video pixel data, the graphics controller may be unable to generate sufficient number of additional pixel data for refreshing a display device at a rate required for a predetermined display quality. As is well known in the art, computer displays may need to be refreshed at a rate of, for example, greater than fifty times per second, to avoid flicker.

On the other hand, if a graphics controller circuit does not wait until source video pixel data is available for interpolation, the graphics controller circuit may generate additional pixel data from an incorrect value for such unavailable pixel datum. As a result, the graphics controller circuit may display noticeable artifacts on a display unit corresponding to the additional pixel data generated by interpolating unavailable pixel data.

SUMMARY OF THE INVENTION

A graphics controller circuit for displaying an upscaled video image corresponding to a source video image is disclosed. The source video image comprises at least a one scan line and an another scan line with each scan line being represented by a set of source video pixel data. The graphics controller of the present invention may comprise an interpolator for generating a set of additional pixel data comprised in the upscaled video image by interpolating the source video pixel data of the one scan line and the another scan line.

The graphics controller circuit may further comprise a first circuit for determining a condition in which at least one of source video pixel data of the another scan line are unavailable for interpolation by the interpolator. A control circuit may cause the interpolator to generate the set of additional pixel data from the source video pixel data of only the one scan line when the source video pixel data of the another scan line are unavailable.

The graphics controller circuit of the present invention may also comprise a bus coupling a memory to the interpolator. The memory may store the source video pixel data of the another scan line and provides the source video pixel data of the another scan line to the interpolator over the bus. The first circuit may determine that source video pixel data of the another scan line are unavailable if the bus may not have sufficient bandwidth to transfer the source video pixel data to the interpolator from the memory.

As the graphics controller may not wait for the source video pixel data of the another scan line, the present invention may enable the graphics controller to generate additional pixel data at a rate required for a predetermined display quality. The present invention may also enable the graphics controller to alleviate bandwidth constraints on the bus.

The graphics controller circuit of the present invention may further comprise a FIFO module including a plurality of FIFOs for buffering data transferred to and from the memory over a bus. The first circuit may determine whether source video pixel data of the another scan line may be unavailable by examining data levels in the plurality of FIFOs. The FIFO module may send to the control circuit a first signal upon a first type of data levels in the plurality of FIFOs, and a second signal upon a second type of data levels in the plurality of FIFOs.

The control circuit may cause the interpolator to generate the additional pixel data from only a subset of the source video pixel data in the one scan line in response to the second signal, and from all of the source video pixel data in the one scan line in response to the first signal. The subset of the source video pixel data in the one scan line may comprise alternate source video pixel data in the one scan line.

BRIEF DESCRIPTION OF THE DRAWINGS

FIG. 1 is a diagram illustrating pixels in a source video image and the additional pixels generated for a corresponding upscaled video image.

DESCRIPTION OF THE PREFERRED EMBODIMENTS

Figure 2:
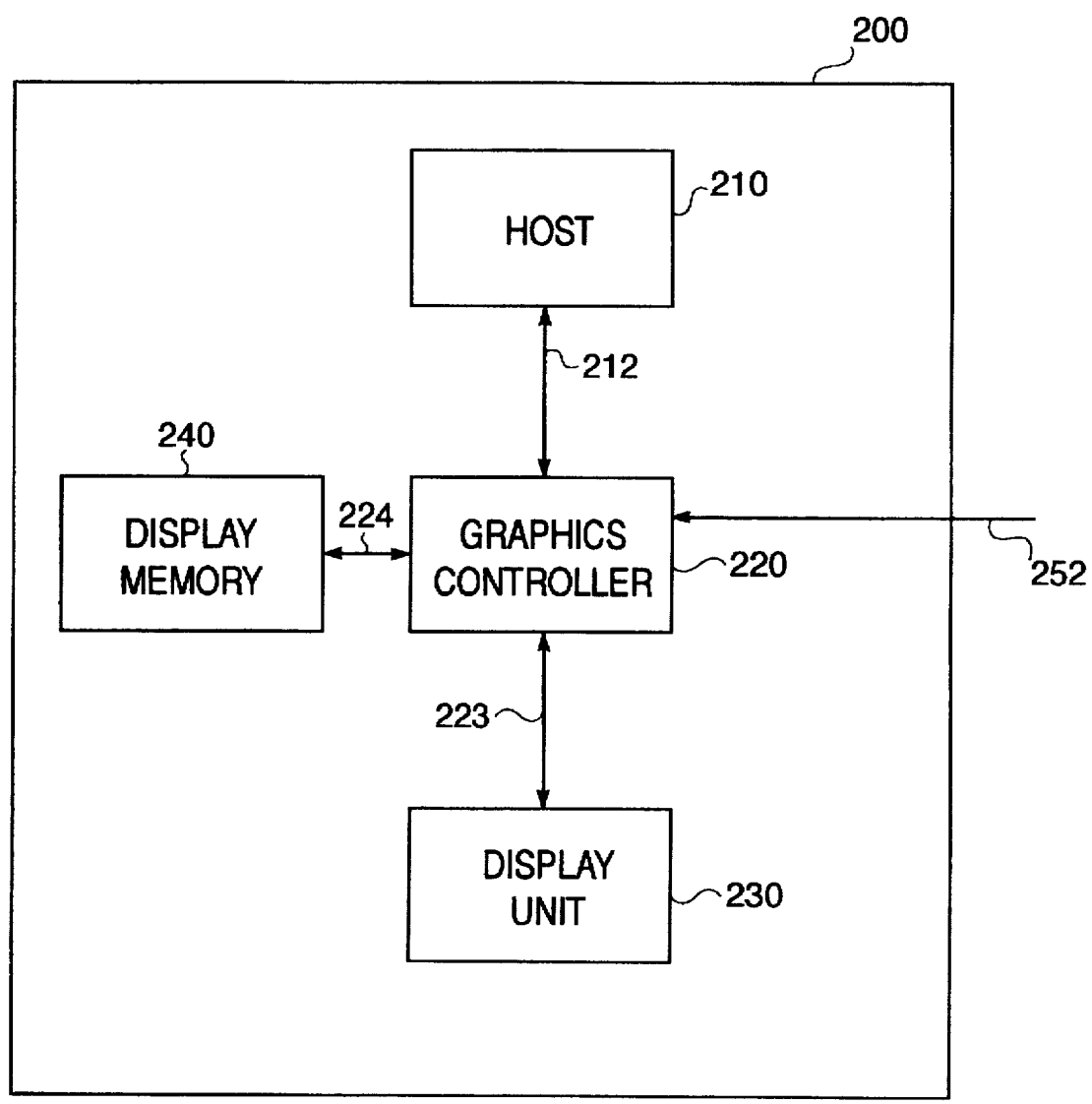
FIG. 2 is a block diagram of a computer system of the present invention comprising a host, a display memory, a graphics controller circuit and a display unit.

FIG. 2 is a block diagram of a computer system 200 of the present invention comprising host 210, graphics controller 220, display memory 240 and display unit 230. Display memory 240 may be integrated with graphics controller 220 as one unit.

Graphics controller 220 may receive pixel data of a source video image from host 210 or from an external device such as a video decoder (not shown) over video path 252, and store the received video pixel data in display memory 240. Graphics controller 220 may then retrieve source video image pixel data from display memory 240 over memory bus 224, upscale the source video image by generating additional pixel data, and generate display signals from the additional pixel data to display an upscaled video image on display unit 230.

To upscale a source video image, graphics controller 220 may normally retrieve source video pixel data of a present scan line and a previous scan line, and interpolate the retrieved source video pixel data to generate additional pixels for an upscaled video image. For example, with reference to FIG. 1, to generate additional pixel data of row 2, graphics controller 220 may interpolate source video pixel data of row 6 (present scan line) and row 1 (previous scan line). Similarly, while generating additional pixel data of row 8, graphics controller 220 may interpolate source video pixel data of row c (present scan line) and row 6 (previous scan line).

However, graphics controller 220 may determine whether source video pixel data of a previous scan line are unavailable, and may generate additional pixel data from source video pixel data of only the present scan line if source video pixel data of the previous scan line are unavailable. The graphics controller 220 may determine that source video pixel data of the previous scan line are unavailable, for example, if memory bus 224 may not have sufficient bandwidth to transfer pixel data for interpolation.

By not using pixel data from a previous scan line for interpolation when bandwidth constraints are present on memory bus 224, graphics controller 220 may not need to wait for source video pixel data of the previous scan line. By not waiting for previous scan line pixel data, graphics controller 220 may generate additional pixel data at a refresh rate required for a predetermined display quality.

It will be appreciated that in view of the high correlation generally present between adjacent pixels in a source video image, any deviation in display quality resulting from using pixel data of a present scan line in stead of pixel data of a previous scan line may be insubstantial, and hence not noticeable by human eye. The resulting display quality may therefore be acceptable.

As graphics controller 220 skips retrieving at least some pixel data when memory bus 224 may not have sufficient bandwidth to transfer all source video image pixel data, the amount of data transferred on memory bus 224 may be reduced compared to memory buses in prior art computer systems. Such reduction may alleviate bandwidth constraints on memory bus 224 and increase overall performance of computer system 200.

It will be further appreciated that graphics controller 220 of the present invention may use only a subset of the present scan line pixel data for interpolation if increased levels of bandwidth constraints are present on memory bus 224 without departing from the scope and spirit of the present invention. For example, graphics controller 220 may retrieve and use only alternate pixel data of a present scan line. As an illustration, graphics controller 220 may retrieve source pixel data C and H (i.e., skip source pixel datum D) for scan line represented by row 6 in FIG. 1, and generate additional pixel data from pixel data C and H.

Although the present invention is explained with reference to a source video pixel data not being available due to bandwidth constraints on memory bus 224, it will be appreciated that it is within the scope and spirit of the present invention to retrieve a lesser number of source video pixel data in response to other situations which result in source video data being unavailable.

Continuing with reference to FIG. 2 again, host 210 may send graphics/text/video data over system bus 212 to graphics controller 220. System bus 212 may comprise, for example, a PCI bus. Graphics data may be received in a RGB 565 format. It will however be appreciated that the graphics data may be in any other format or with different number of bits of representation without departing from scope and spirit of the present invention.

Graphics controller 220 may receive graphics/text/video data over system bus 212 and store in display memory 240 the graphics/text/video data along with any video data received over video path 252. Video data may comprise a television signal or any video image encoded in RGB format or YUV format or any other format for encoding video image. For example, the video data can be pixel data corresponding to a full motion video architecture (TM) (MVA) image. Graphics controller 220 may then display the display data comprising all of video data, text data and graphics data on display unit 230.

Figure 3:
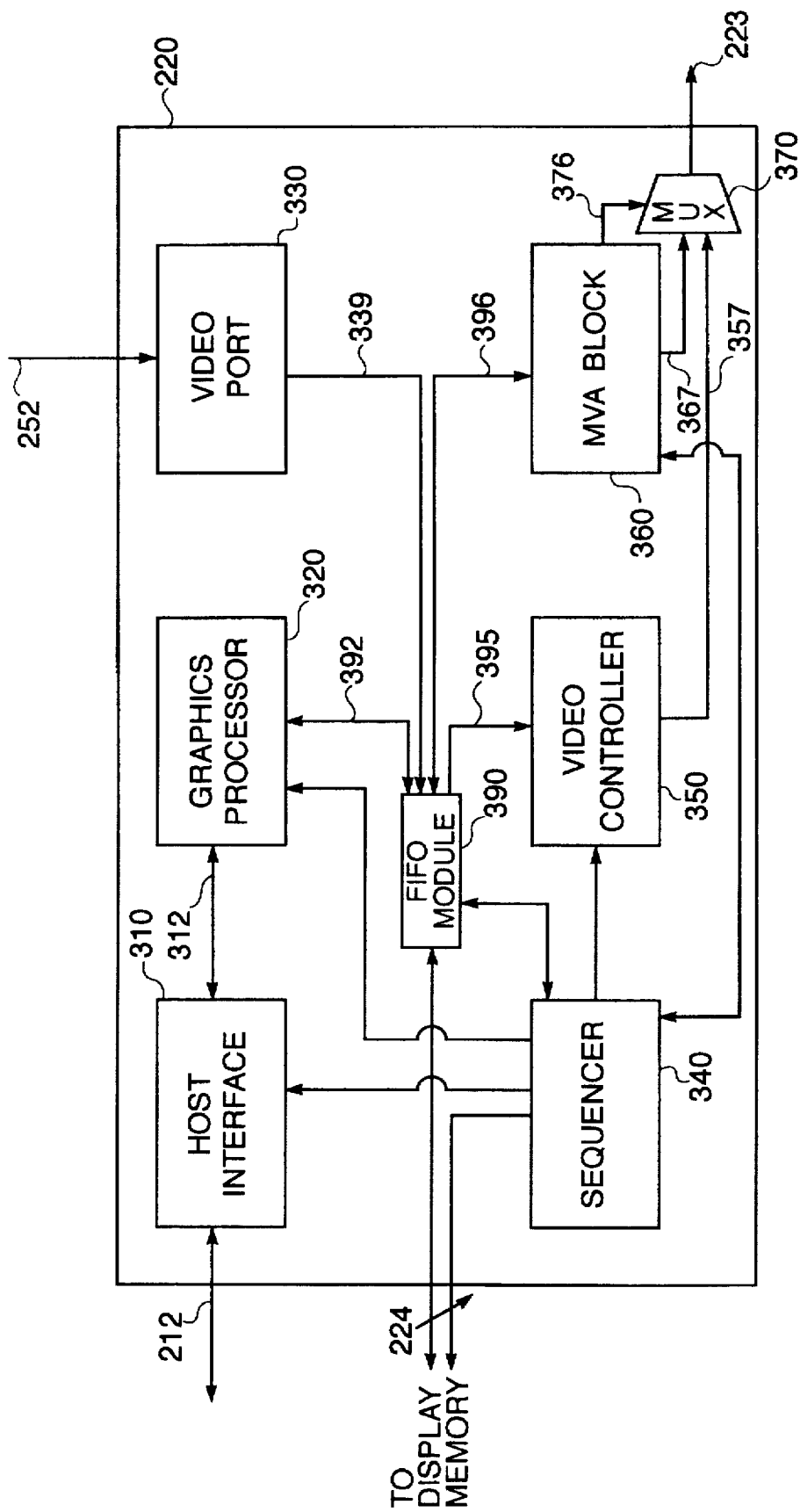
FIG. 3 is a block diagram of the graphics controller of the present invention including an MVA block, and a FIFO module.

FIG. 3 is a block diagram of graphics controller 220 of the present invention comprising FIFO module 390, MVA block 360, video controller 350, sequencer 340, graphics processor 320, host interface 212 and video port 252. FIFO module 390 of the present invention may indicate over bus 396 whether memory bus 224 has insufficient bandwidth to transfer source video pixel data normally required for interpolation. FIFO module 390 may comprise several individual FIFOs, each serving one of the components such as graphics processor 320. FIFO module 390 may determine whether memory bus 224 has sufficient bandwidth by examining water mark levels on the individual FIFOs.

MVA block 360 may normally retrieve source video pixel data of a present scan line and a previous scan line from display memory 240 via FIFO module 390, and generate additional pixel data for a stretched video image from the retrieved source video pixel data. However, when FIFO module 390 indicates that memory bus 224 may not have sufficient bandwidth to transfer all source video pixel data normally used for interpolation, MVA block 360 may retrieve pixel data of only present scan lines, and generate additional pixel data from just the additional scan lines. In effect, the additional pixel data may be generated by replicating source video pixel data of the present scan line.

Figure 1:
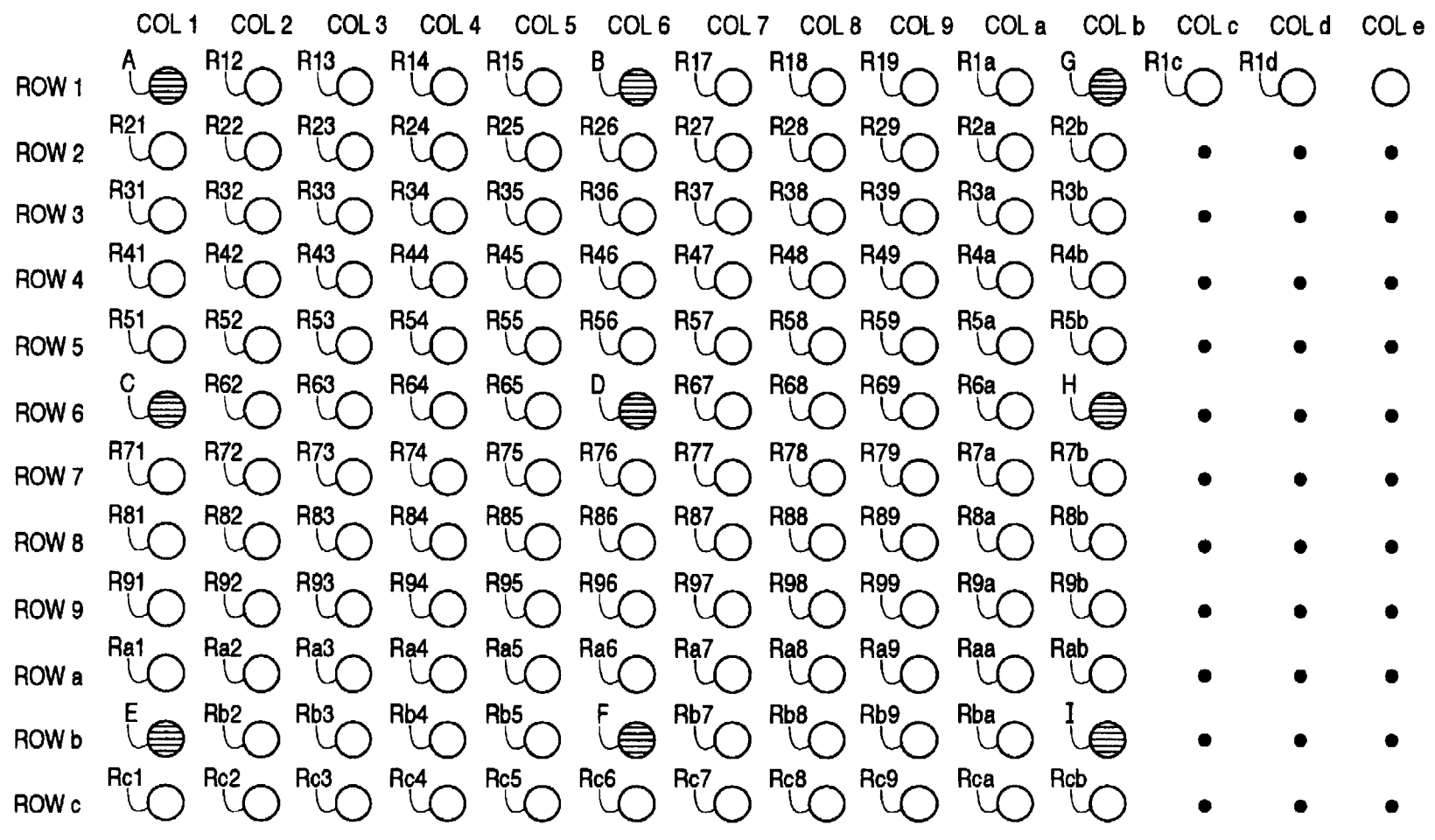

For example, while generating additional pixel data for row 4 of FIG. 1, MVA block 360 normally generates pixel data for row 4 from source video pixel data in rows 1 and 4, i.e., A, B, C, D, G, H. However, if FIFO module 390 indicates that memory bus 224 may not have sufficient bandwidth for timely transferring source video pixel data from display memory 240, MVA block 360 may generate additional pixel data from source video pixel data C, D and H only. As MVA block 360 may retrieve lesser number of source video pixel data from display memory 240, the amount of data transferred over memory bus 224 may be decreased.

Host interface 310 interfaces with system bus 212 to receive graphics/text data and instructions from host 210. Host interface 310 may be designed to interface with specific bus architecture implemented in system bus 212. For example, if system bus 212 comprises a PCI bus, host interface 310 may be designed to interface with a PCI standard bus.

Graphics processor 320 may receive graphics/video/text data and instructions from host interface 310. Graphics processor 320 may execute instructions such as rotate, bit blocking on the received graphics data according to the instructions received and may generate additional graphics data as a result. Graphics processor 320 may store graphics data (either as received from host interface 310 or generated by executing instructions) in display memory 240 via FIFO module 390.

Video port 330 may receive video pixel data over video path 252, and write the received video pixel data into display memory 240 via FIFO module 390. Video pixel data received may be in a format different from graphics data. For example, the video data can be in YUV format while graphics data may be in an RGB format.

Graphics data may be represented using a different number of bits to represent a pixel in relation to the video data. For example, graphics data may be represented using eight bits per pixel while video data may be represented using twenty-four bits per pixel. Representing video data using a higher number of bits may allow for better resolution of video data.

It will be further appreciated that although video port 330 of present embodiment writes video data into display memory 240 before the video data is displayed, it is within the scope and spirit of the present invention to directly display video data on display unit 230 without being written into display memory 240.

Video controller 350 may receive graphics/text data from display memory 240 over memory bus 224 via FIFO module 390, and provide bits corresponding to RGB signals over a mux input line 357. Video controller 350 may then convert text data into corresponding pixels by, for example, using a font bit map stored in display memory 240. As a result of such conversion, video controller 350 sends to multiplexor 370 bits corresponding to RGB signals of graphics/text data received.

Multiplexor 370 may accept as input RGB bits corresponding to graphics/text data and video pixel data on mux input lines 367 and 357 respectively, and selects as output one of the two inputs under the control of mux select signal 376 asserted by MVA Block 360. If display on display unit 230 at present screen refresh time corresponds to video data, mux select signal 376 is asserted so as to select video data on mux input line 367. On the other hand, if the display on the display unit 230 corresponds to graphics/text data sent by Host 210, mux select signal 376 is asserted so as to select the graphics/text data on mux input line 357.

Sequencer 340 provides timing control to video controller 350, MVA block 360, graphics processor 320, host interface 210, and display memory 240. The timing control may include various dot (pixel) clocks and horizontal count resolution.

Figure 4:
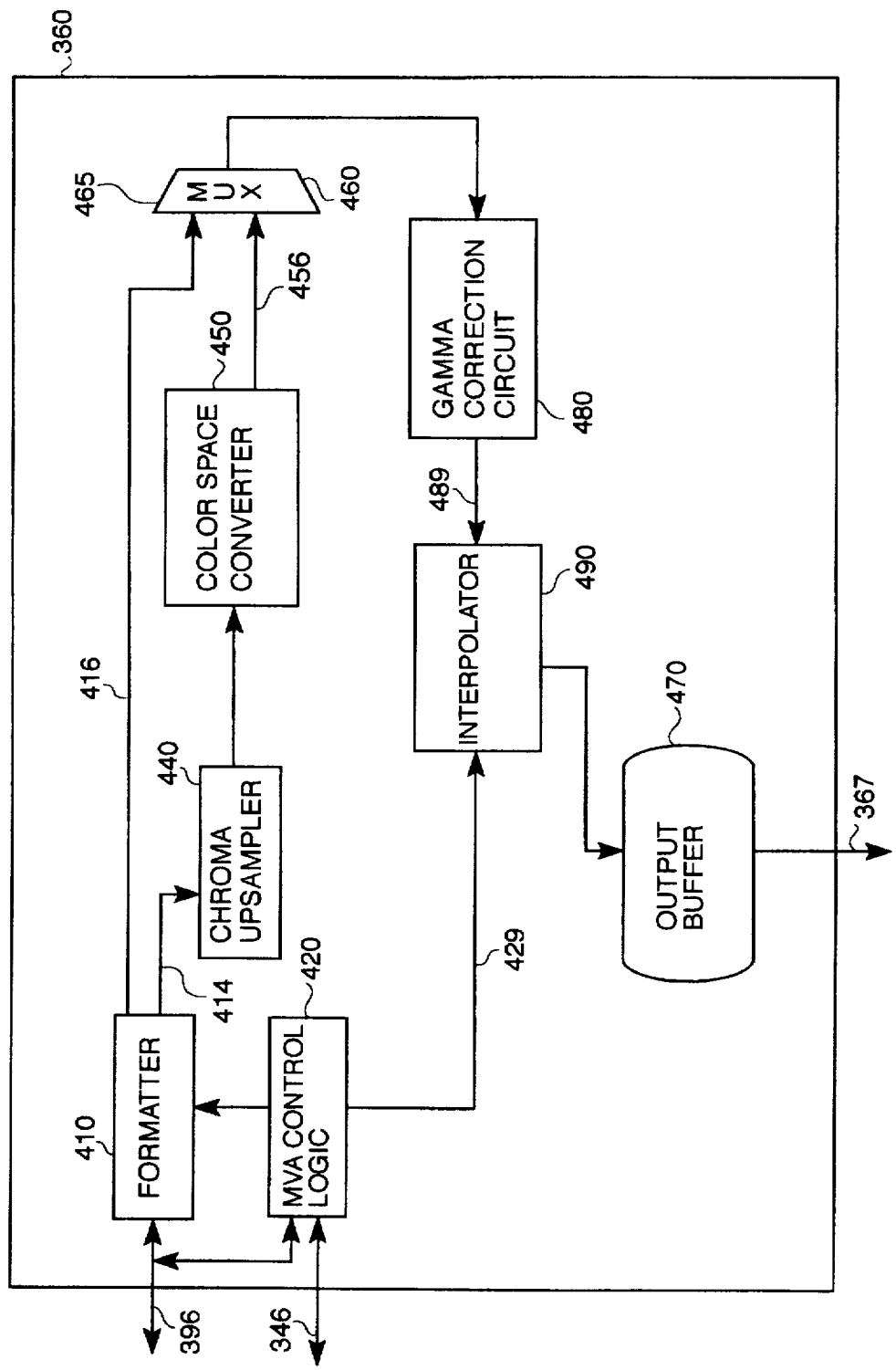
FIG. 4 is a block diagram of the MVA block including an interpolator which upscales a source video image.

FIG. 4 is a block diagram of MVA Block 360 of the present invention. MVA Block 360 may comprise formatter 410, chroma upsampler 440, color space converter 450, MVA control logic 420, YUV-RGB select multiplexor 460, interpolator 490, override multiplexor 485, gamma correction circuit 480, and output buffer 470.

Interpolator 490 of the present invention may receive source video pixel data from gamma correction circuit 480 and interpolate the received source video data under the control of MVA control logic 420. Interpolator 490 normally generates additional pixel data from a set of source video pixel data of representing a present scan line and a previous scan line.

However, when all of the set of source video pixel data are not available, for example due to bandwidth limitation on memory bus 224, interpolator 490 of the present invention may generate additional pixel data for an upscaled video image from only a subset of the set of source of source video pixel data. The subset may comprise only source video pixel data of the present scan line or a further subset thereof.

In an alternate embodiment, interpolator 490 may comprise a higher order interpolator, and generate additional pixel data normally from source video pixel data of more than two scan lines. For example, with reference to FIG. 1, interpolator 490 may generate pixel data R96 from source video pixel data in row 1, row 6 and row b. However, when bandwidth constraints are detected on memory bus 224, interpolator 490 may generate additional pixel data only from two scan lines, and function as a lower-order interpolator.

Interpolator 490 may store all pixel data of the upscaled video image in output buffer 470. Output buffer 470 may store such pixel data, and provide pixel data of the upscaled video image to multiplexor 370 on bus 367 for display on display unit 230.

MVA control logic 420 of the present invention interfaces with FIFO module 390 and sequencer 340 to coordinate retrieval of source video pixel data used for interpolation according to the present invention. MVA control logic 420 may normally send a signal to FIFO module 390 to request retrieval of source video pixel data of a present scan line and a previous scan line.

However, when FIFO module 390 indicates that bandwidth constraints may be present on memory bus 224, MVA control logic 420 skips requesting source video pixel data of the previous scan line. Therefore, MVA control logic 420 may retrieve source video pixel data of only a present scan line when FIFO module 390 indicates that memory bus 224 may not have sufficient bandwidth to timely transfer source video pixel data. MVA control logic 420 may send another type of signal to FIFO module 390 to retrieve only alternate pixels in the present scan line if a higher degree of bandwidth problems are encountered on memory bus 224.

MVA control logic 420 of the present invention may also indicate to interpolator 490 whether all source video pixel data normally used for generating additional pixel data are being retrieved. If MVA control logic 420 is causing retrieval of only source video pixel data of previous scan line, and upon such indication to interpolator 490 over bus 429, interpolator 490 may generate additional pixel data from source video pixel data of present scan line. If MVA control logic 420 is retrieving only alternate pixel data of a present scan line, MVA control logic 420 may so indicate, and interpolator 490 may generate additional pixel data from just alternate pixel data of the present scan line.

Formatter 410 may receive source video image pixel data from display memory 240 over bus 396. The video data may be in any format such as RGB 555 format or RGB 888 or YUV 4:2:2. Formatter 410 converts RGB 555 or 565 data into 888 format, and sends converted data over a 24-bit bus 416 to multiplexor 465. Formatter 410 therefore converts received pixel data into expected pixel format. If source video data is in YUV format, formatter 410 sends YUV signals over a bus 414.

Chroma upsampler 440 upsamples the chroma component of the YUV signal to compensate for potential down-sampling of the chroma signals while transmitting the source video signal to the computer system. Such down-sampling is typically done while scanning a television signal to take advantage of low spacial resolution for chroma compared to luminance to the human eye. Color space converter 450 converts the input YUV signal to RGB 888 format before sending such RGB 888 format data over 24-bit bus 456.

YUV-RGB select multiplexor 460 may receive as input source video data in RGB 888 format on input lines 416 or 456 depending on whether source video data is in RGB or YUV formats respectively. YUV-RGB select multiplexor 460 may select one of the two inputs under control of input YUV-RGB select signal 465, which is typically driven from a bit in a register programmed by user. Gamma correction circuit 480 may remove gamma from video signal and is conventional in the art.

Hence, MVA control logic 420 interfaces with FIFO module 390 to determine whether memory bus 224 has sufficient bandwidth to timely provide source video pixel data for interpolation. If FIFO module 390 indicates that memory bus 224 may not have sufficient bandwidth, MVA control logic 420 causes interpolator 490 to generate additional pixel data from source video pixel data of only the present scan line. By not waiting for pixel data of previous scan line, interpolator 490 may generate additional pixel data at a rate required for a predetermine image quality while displaying a corresponding upscaled video image.

Figure 5:
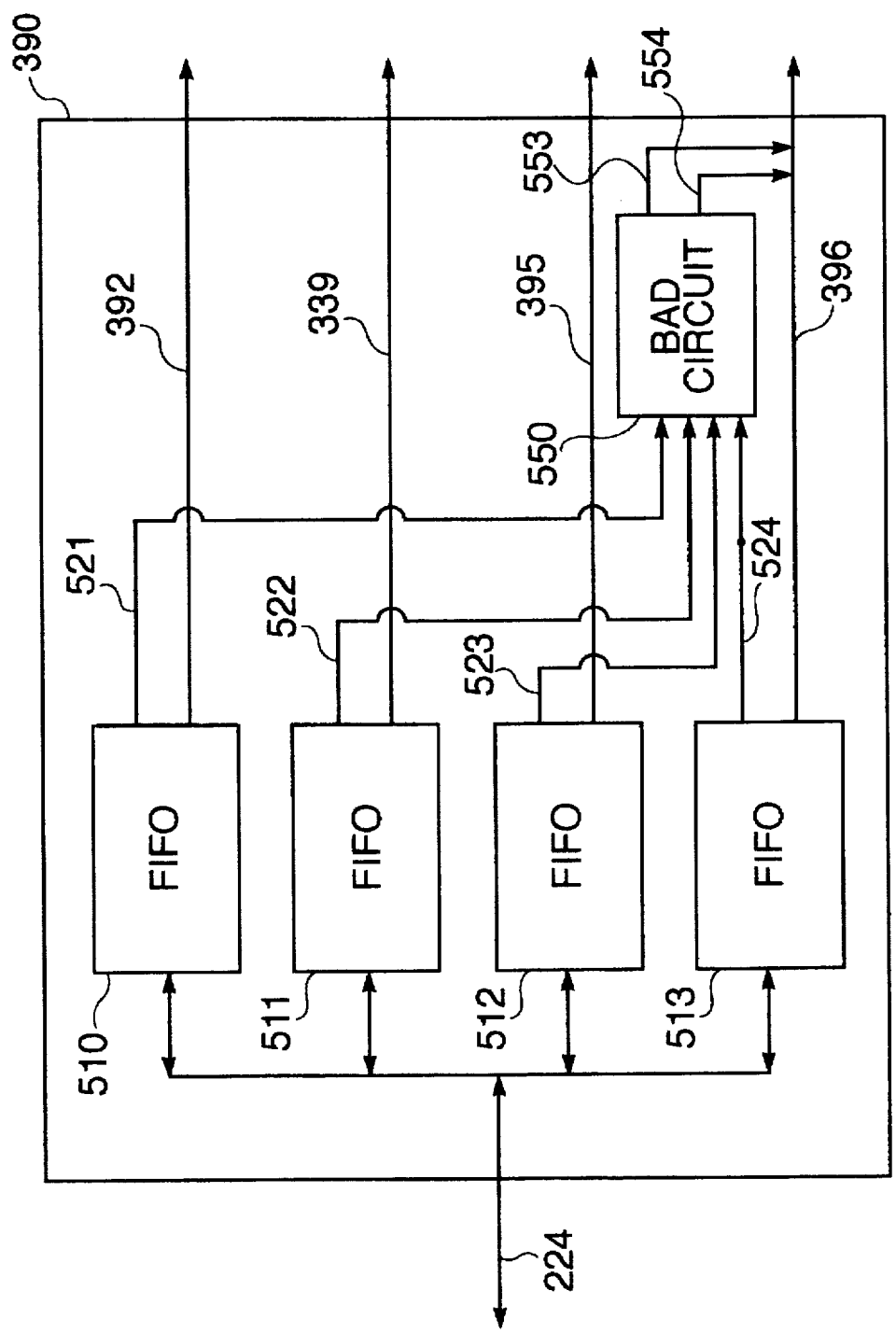
FIG. 5 is a block diagram of the FIFO module illustrating operation of a bandwidth availability determination (BAD) circuit.

FIG. 5 is a block diagram of FIFO module 390 of the present invention comprising FIFOs 510–513 and bandwidth availability determination (BAD) circuit 550. Each of FIFOs 510–513 may have a pointer indicating data levels (also referred to water mark levels) stored in corresponding FIFO. The data level may go 'lower' as data is read from a FIFO, and may go 'higher' as data is written into the FIFO.

FIFO 510 may be bidirectional (i.e., having both read and write capabilities), and allow host interface 310 to read and write data from and into display memory 224. FIFO 511 may function as an intermediate buffer for video port 330 to write source video pixel data to display memory 240. FIFO 512 may function as intermediate buffer to provide graphics data to video controller 350, and FIFO 513 may function as intermediate buffer to provide source video data to MVA block 360.

BAD circuit 550 of the present invention examines water mark levels on FIFOs 510–513 to determine whether memory bus 224 may not have sufficient bandwidth to transfer source video pixel data for interpolation. For a FIFO (for example FIFO 511 corresponding to video port 330) that stores data for writing into display memory 240, a high water mark level may contribute to a determination of the unavailability of bandwidth as memory bus 224 transfers data in such FIFO to display memory 240. On the other hand, a low water mark level on a FIFO that functions as buffer for providing data from display memory 240 (for example FIFO 512) contributes to determination of unavailability of bandwidth.

BAD circuit 550 of the present invention may give different levels of significance to water mark levels on different FIFOs as water mark levels on some FIFOs may be more critical than that of other FIFOs. For example, data level on FIFO 512 may need to be maintained above a certain level to insure sufficient amount of video pixel data is available for video controller 350 to refresh display on display unit 230. Hence, if data in FIFO 512 (corresponding to video controller 350) falls below a predetermined level (a low water mark level), BAD circuit 550 may give more weight to such low level in making a determination that bandwidth may not be available on memory bus 224 for transferring source video pixel data for interpolation.

BAD circuit 550 may indicate bandwidth unavailability (and consequently unavailability of source video pixel data) to MVA control logic 420 over signal lines 553 and 554 (in bus 396). Signals on lines 553 and 554 may indicate different extent of bandwidth unavailability. For example, BAD circuit 550 may indicate a higher degree of unavailability by a signal on line 553, and lower level of unavailability by a signal on line 554. A high degree of unavailability may be, for example, due to a condition in which all FIFOs writing into display memory 240 are full, and FIFOs reading from display memory 240 are empty.

In response to signals on signal lines 553 and 554, MVA block 360 may adopt different strategies in retrieving source video data pixels. If a signal is received on line 553, MVA block 360 may retrieve pixel data of only present scan line and refrain from retrieving pixel data of a previous scan line required for interpolation. On the hand if a signal is received on line 554, MVA block 360 may retrieve only alternate source video pixel data within the present scan line. MVA block 360 my generate additional pixel data from only such retrieved pixel data.

As MVA block 360 retrieves only a subset of the source video pixel data normally used for interpolation, bandwidth problems may be alleviated on memory bus 224. Also, as MVA block 360 may not wait for source video pixel data of previous scan lines while generating additional pixel data, MVA block 360 may generate additional pixel data at a required rate.

In addition, by generating additional pixel data from just source video pixel data of present scan line, MVA block 360 of the present invention may avoid displaying artifacts because of unavailability of source video pixel data of previous scan line. Because of high correlation generally present between adjacent pixels in video images, any deviation in upscaled video image resulting from using present scan pixel data only for interpolation, may be insubstantial. As a consequence such upscaled video image may be indiscernible by human eye.

Although the present invention has been illustrated and described in detail, it is clearly understood that the same is by way of illustration and example only and is not to be taken by way of limitation, the scope and spirit of the present invention being limited only by the terms of the appended claims.

What is claimed is:

1. A graphics controller circuit for upscaling a source video image to generate an upscaled video image, wherein the source video image comprises at least a one scan line and an another scan line represented by a set of source video pixel data, said graphics controller circuit comprising:

an interpolator generating a set of additional pixel data comprised in the upscaled video image by interpolating the source video pixel data of the one scan line and the another scan line;

a first circuit for determining a condition in which at least one of the source video pixel data of the another scan line are unavailable for interpolation by said interpolator; and a control circuit to cause said interpolator to generate the set of additional pixel data from the source video pixel data of only the one scan line when the source video pixel data of the another scan line are unavailable.

2. The graphics controller circuit of claim 1 further comprising a bus coupling a memory to said interpolator, wherein said memory stores the source video pixel data of the another scan line and provides the source video pixel data of the another scan line to said interpolator over the bus, and wherein the condition comprises bandwidth unavailability on said bus to transfer the source video pixel data to said interpolator from said memory.

3. The graphics controller circuit of claim 2 further comprising a FIFO module including a plurality of FIFOs for buffering data transferred to and from said memory, and wherein said first circuit determines said condition by examining data levels in the plurality of FIFOs.

4. The graphics controller circuit of claim 3 wherein said FIFO module sends to said control circuit a first signal upon detecting a first type of data level in the plurality of FIFOs, and a second signal upon detecting a second type of data level in the plurality of FIFOs.

5. The graphics controller circuit of claim 4 wherein said control circuit causes said interpolator to generate the additional pixel data from only a subset of the source video pixel data in the one scan line in response to the second signal, and from all of the source video pixel data in the one scan line in response to the first signal.

6. The graphics controller circuit of claim 5 wherein the subset of the source video pixel data in the one scan line comprises alternate source video pixel data in the one scan line.

7. A computer system for displaying a source video image comprising a one scan line and an another scan line represented by a set of source video pixel data, the computer system comprising:

a display unit for displaying an upscaled video image corresponding to the source video image;

a display memory for storing the set of source video pixel data; and a graphics controller circuit for generating display signals to said display unit, said graphics controller circuit further comprising:

a host interface for receiving the set of source video pixel data from said display memory;

an interpolator generating a set of additional pixel data comprised in the upscaled video image by interpolating the source video pixel data of the one scan line and the another scan line;

a first circuit for determining a condition in which at least one of the source video pixel data of the another scan line are unavailable for interpolation by said interpolator; and a control circuit to cause said interpolator to generate the set of additional pixel data from the source video pixel data of only the one scan line when the source video pixel data of the another scan line are unavailable.

8. The computer system of claim 7 further comprising a bus coupling said memory to said host interface, wherein the condition comprises bandwidth unavailability on said bus to transfer the source video pixel data to said interpolator from said memory.

9. The computer system of claim 8 further comprising a FIFO module including a plurality of FIFOs for buffering data transferred to and from said memory, and wherein said first circuit determines said condition by examining data levels in the plurality of FIFOs.

10. The computer system of claim 9 wherein said FIFO module sends to said control circuit a first signal upon detecting a first type of data level in the plurality of FIFOs, and a second signal upon detecting a second type of data level in the plurality of FIFOs.

11. The computer system of claim 10 wherein said control circuit causes said interpolator to generate the additional pixel data from only a subset of the source video pixel data in the one scan line in response to the second signal, and from all of the source video pixel data in the one scan line in response to the first signal.

12. The computer system of claim 11 wherein the subset of the source video pixel data in the one scan line comprises alternate source video pixel data in the one scan line.

13. A method of upscaling a source video image to generate an upscaled video image, wherein the source video image comprises at least a one scan line and an another scan line represented by a set of source video pixel data, the method comprising the steps of:

generating a set of additional pixel data comprised in the upscaled video image by interpolating the source video pixel data of the one scan line and the another scan line;

determining whether at least one of the source video pixel data of the another scan line are unavailable to said step of generating a set of additional pixel data; and generating the set of additional pixel data from the source video pixel data of only the one scan line when the source video pixel data of the another scan line are unavailable.

14. The method of claim 13 further comprising the steps of:

storing the source video pixel data of the another scan line in a memory;

providing the source video pixel data stored in the memory to said step of generating a set of additional pixel data over a bus;

wherein said step of determining comprises determining whether the bus had sufficient bandwidth to transfer bus to transfer the source video pixel data stored in the memory to said step of generating a set of additional pixel data.

15. The method of claim 14 wherein said step of determining comprises examining data levels in a plurality of FIFOs comprised in a FIFO module.

16. The method of claim 15 further comprising the step of generating a first signal upon detecting a first type of data level in the plurality of FIFOs, and a second signal upon detecting a second type of data level in the plurality of FIFOs.

17. The method of claim 16 said step of generating the set of additional pixel data further comprises the steps of:
   generating the additional pixel data from only a subset of the source video pixel data in the one scan line in response to the second signal; and
   generating the additional pixel data from all the source video pixel data in the one scan line in response to the first signal.

18. The method of claim 17 wherein the subset of the source video pixel data in the one scan line comprises alternate source video pixel data in the one scan line.

* * * * *